Nov. 11, 1947.  S. C. MOON  2,430,528
MOTORIZED WHEEL
Filed Dec. 12, 1942  2 Sheets-Sheet 2

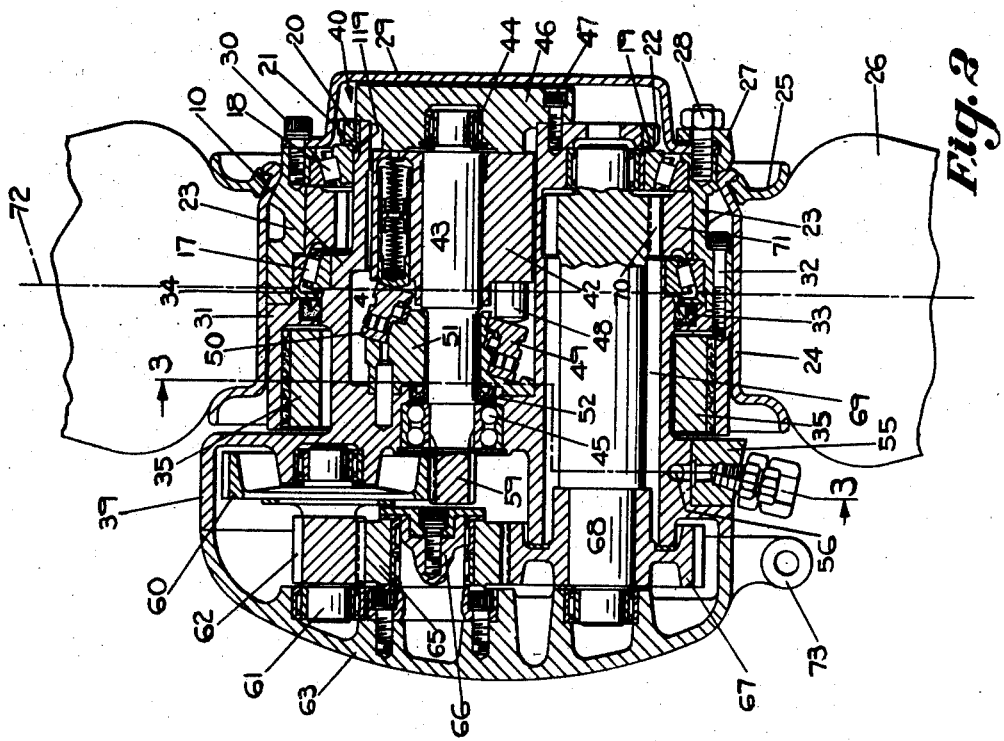

INVENTOR:
STERLING C. MOON,
By Chas. M. Niesen,
ATT'Y.

Patented Nov. 11, 1947

2,430,528

UNITED STATES PATENT OFFICE 2,430,528

MOTORIZED WHEEL

Sterling C. Moon, Worthington, Ohio, assignor, by mesne assignments, to The Jeffrey Manufacturing Company, a corporation of Ohio Application December 12, 1942, Serial No. 468,848

12 Claims. (Cl. 180—66)

This invention relates to a motorized wheel and the principal object of the invention is to provide improved motorized wheel construction with a high horse power rating requiring a minimum of space with reduction gearing between the driving motor and the wheel.

A further object of the invention is to provide a compact and economical arrangement of a motorized wheel employing a hydraulic motor mounted principally within the axial and radial dimensions of the wheel together with reduction gearing for driving the wheel from the motor.

Still another object of the invention is to provide a compact arrangement of steerable motorized wheel employing a hydraulic motor largely within the radial and axial confines of the wheel together with speed reducing gearing between the hydraulic motor and the wheel and brake mechanism provided for the wheel.

Still another object of the invention is to provide an extremely compact motor wheel employing a hydraulic motor to obtain maximum horse power rating for a minimum of size.

Other objects of the invention will appear hereinafter, the novel features and combinations being set forth in the appended claims.

In the accompanying drawings,

Fig. 1 is a sectional view on an upright axis through the motorized wheel of my invention, the holding bracket being shown only partly in section;

Fig. 2 is a section of the wheel of Fig. 1 taken in a horizontal plane or at right angles to the plane of Fig. 1, the supporting bracket being omitted in the interest of clearness;

Figure 3:
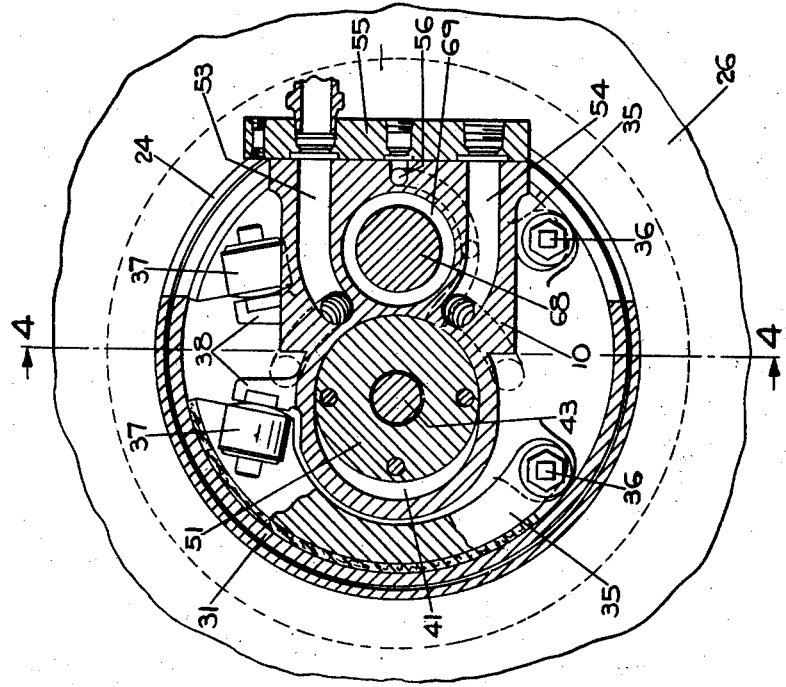
Fig. 3 is a sectional view taken on the line 3—3 of Fig. 2 looking in the direction of the arrows with certain parts omitted in the interest of clearness.

Referring particularly to Figs. 1 and 2 of the drawings, it will be seen that the motorized wheel of my invention includes a large casting 10 which forms a stub axle or frame upon which a wheel is mounted for rotation as hereinafter described. The casting 10 is provided with spaced trunnions 11, 11 which are received in upper and lower bracket cups 12 and 13 formed integral with upper and lower bracket members 14 and 15, respectively, the lower bracket member 15 preferably being an extension of an axle of a vehicle. The trunnions 11, 11 are preferably mounted in the cups 12 and 13 by anti-friction roller bearings 16, 16. It is evident that the pivotal mounting of the casting 10 on bracket members 14—15 makes the motorized wheel steerable in character which is the preferred construction. It is, of course, within the realm of my invention to attach the casting 10 permanently to the bracket members 14—15 to make a non-steerable motorized wheel.

The outer end of the casting or stub axle 10 is provided with spaced cylindrical surfaces upon which are mounted spaced anti-friction roller bearings 17 and 18, the inner race of the former abutting against an annular shoulder formed on the casting 10 and the inner race of the latter abutting a large annular washer 19 which is held in position by a large threaded nut 20 which is threaded on the outer edge of the casting 10 and operates to adjust the roller bearings 17 and 18. The washer 19 is held against rotation by projections 119 extending into grooves in the outer end of casting 10 and is provided with bendable locking tabs 21 which cooperate with receiving notches 22 formed in the outer periphery of the nut 20 to lock the latter after it is screwed to the desired position. The roller bearings 17 and 18 provide anti-friction support for a wheel 23 which is thus mounted upon said stub axle or casting 10 for free rotation.

The wheel 23 is provided with a tire receiving rim 24 which may have a removable ring 25 to provide for ready removal of a pneumatic or rubber tire 26. The rim 24 is removably attached to the wheel 23 by lugs 27 (see Fig. 2) and cooperating lug bolts and nuts 28. The wheel 23 also includes a removable hub cap 29 removably attached thereto as by screws 30. Also rigidly attached to the wheel 23 and in fact constituting a part thereof, is a brake drum 31 which is screwed to the wheel 23 as by screws 32 (see bottom of Fig. 2). The brake drum 31 has an upright web which carries a large ring grease seal 33 which is formed in a groove in said web and which cooperates with an adjacent cylindrical surface formed on casting 10. Also cooperating with the grease seal 33 to hold it removably in place as well as forming a part of the seal is a removable metal ring 34 which is held in place adjacent the outer race of the anti-friction bearing 17 and adjacent an outer wall of the brake drum 31, said ring 34 also being formed in an annular groove formed adjacent the inner edge of the wheel 23. Brake shoes 35, 35 (Fig. 3) are pivotally mounted at their bottoms to adjusting and supporting bolts 36, 36 which are attached to wings formed integral with the casting 10. The upper end of each brake shoe 35 carries a hydraulically operated cylinder motor 37, each having a piston adapted to bear against an integral bracket 38 also formed on the casting 10.

As clearly seen by reference to Fig. 2 of the drawings, the brake mechanism is substantially completely housed within the brake drum 31 and the casting 10 which is provided with an elongated oval shaped extension 39 which is formed as an integral part of said casting 10, the elongated axis of the oval shaped extension 39 being in a substantially horizontal plane as is evident by comparison between Figs. 1 and 2 of the drawings.

The casting or stub axle 10 is, of course, non-rotary in character, being held against rotation by the trunnions 11, but it is mounted for pivotal movement by said trunnion. This casting forms a housing or casing for a driving motor and therefore is actually an integral part of the driving motor which is designated generally by the reference character 40.

In the drawings, I have illustrated the motor 40 as of the hydraulic type and this is the preferred type of motor because in general by employing hydraulic fluid of high pressure it is possible to obtain greater horse power per unit of volume from a hydraulic motor as compared with other types of motors, but it is to be distinctly understood that in some of the broader aspects of my invention as defined by some of the broader claims the motor 40 may be of any other desired type and, for example, may be an electric motor.

Fundamentally the hydraulic motor 40 preferably is of the structure disclosed and claimed in the application of Robert K. Jeffrey, deceased, Serial No. 348,765, filed July 31, 1940, now Patent No. 2,331,694, granted October 12, 1943, entitled "Hydraulic pump or motor." Other hydraulic motors of this same general type may be employed if desired.

Briefly described, said motor 40 includes a housing which is part of the casting 10 the inner walls of which are formed by an enlarged cavity or opening 41 in said casting 10, in which cavity 41 also is a rotor 42 mounted on and keyed to a rotor shaft 43 which is mounted in spaced anti-friction bearings 44 and 45, the bearing 44 being in a head plate 46 of the motor 40, which head plate 46 is removably attached to the casting 10 as by screws 47. The head plate 46 is provided with appropriate feed and discharge ports and conduits communicating with the axially extending cylinder of the rotor 42 as disclosed in full detail in the above mentioned application of Robert K. Jeffrey, deceased, and as is well understood by those familiar with hydraulic motors of this general type.

Figure 4:
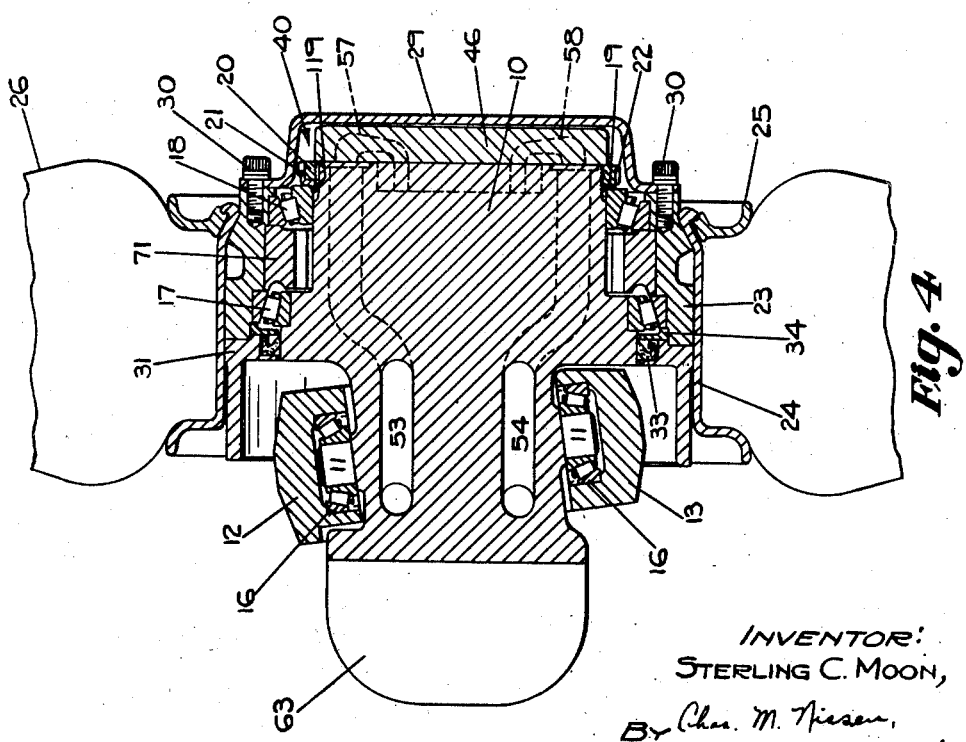
Fig. 4 is a sectional view taken on the line 4—4 of Fig. 3 looking in the direction of the arrows with certain parts omitted in the interest of clearness.

The rotor 42 has a plurality of reciprocating pistons 48 within the cylinders above mentioned, which pistons 48 cooperate with the tilted ring 49 mounted by anti-friction bearings on a tilted swash plate 50 which is supported upon a base 51 screwed and keyed to the casting 10. Formed in a groove in said casting 10 and adjacent the base 51 and anti-friction bearing 45 and cooperating with the rotor shaft 43 is an oil seal 52. In Fig. 3 of the drawings, the pressure and return conduits 53 and 54 are shown leading from a head plate 55 attached to the casting 10, said conduits 53 and 54 being formed in the casting 10 and leading to distribution conduits 57 and 58, respectively, in the head plate 46 (see Fig. 4). It may be stated that the conduits 53 and 54 will be respectively pressure and return conduits, depending upon the direction of rotation of the motor 40, which motor is of the reversible character and will be driven in reverse direction at the option of the operator merely by making said conduits 53 and 54 successively pressure and return conduits. A drain conduit 56 is also provided to drain leakage oil from the cavity 41 as well as other cavities in casting 10.

The rotor shaft 43 of the motor 40 is connected to drive the wheel 23 through reduction gearing which, in the preferred embodiment of my invention, includes three speed reductions which I shall now describe. The inner end of the rotor shaft 43 is provided with a pinion gear 59 preferably formed integral therewith which meshes with and drives a larger gear 60, which gear 60 is formed integral with a shaft 61 which carries thereon a small gear 62 also formed integral therewith. Shaft 61 is supported in anti-friction bearings one of which is mounted in a cup in extension 39 of casting 10, the other of which is mounted in a cup formed on an oval shaped removable cap 63 which is removably attached to extension 39 and cooperates therewith to form a gear casing or housing, said cap 63 being removably attached by machine screws 64 (see Fig. 1). Gear 62 meshes with an idler gear 65 mounted by anti-friction bearings on a stub shaft 66 removably mounted, as by machine screws, to the cap 63, said stub shaft 66 having a removable head which removably holds the idler gear 65 thereon. Idler gear 65 meshes with a relatively large gear 67 which is keyed to a shaft 68 mounted upon spaced anti-friction bearings, one of which is held in a cup in removable cap 63, the other of which is in a cup formed at the outer end of a cavity or opening 69 formed in the casting 10. Formed integral with the shaft 68 is a pinion gear 70 which meshes with an internally toothed ring gear 71 which is rigidly attached to the wheel 23 and is positioned between the anti-friction bearings 17 and 18.

There is a three stage reduction between the rotor shaft 43 and wheel 23, the first reduction being between gears 59 and 60, the former being smaller than the latter, the second reduction being between gears 62 and 67, the former being smaller than the latter, the interposed idler gear 65 having no reducing effect. The third reduction is between gears 70 and 71, the former being considerably smaller than the latter.

By reference particularly to Fig. 2 of the drawings it will be noted that the driving motor and gear train by which it is connected to the wheel is extremely compact and most of the motor and final drive is within both the radial and axial confines of the complete wheel, the complete wheel in this case and in the claims being understood as including not only the wheel proper designated by the reference character 23 but also the attached brake drum 31.

There are a number of structural features which cooperate to provide this compact arrangement while at the same time providing for the desired three speed gear reduction which I shall point out hereinafter. It may be stated that while the three stage gear reduction is the preferred arrangement, it is within the scope of my invention in some of its broader aspects that the speed reduction be of the single or double stage type.

The compactness of the parts providing for ready mounting of the motorized wheel on a vehicle so that it can be steered, is the result of certain combinations and arrangements, many of which are evident from the above description and some of which I shall now point out particularly.

In the first place the casting 10 is in the form of a hollow stub shaft which forms a housing for the motor 40 and portions of the gear train leading to the wheel 23. By reference to Fig. 2 of the drawings wherein a center line for the wheel 23 and the tire 26 is illustrated at 72, said center line being in a plane at right angles to the axis of rotation of the wheel, it will be seen that the motor 40 extends on both sides of the center line or plane, namely, to the outside or right as viewed in Fig. 2 and also to the inside or left as viewed in said Fig. 2. The rotor 42 extends principally to the right or outside of the center line or plane 72. The rotor shaft 43 has such length that it extends both outwardly and inwardly beyond the axial confines of the wheel 23—31.

It may also be noted by reference particularly to Fig. 2 that the axis of the rotor shaft 43 is parallel with the axis of rotation of the wheel 23—31 but is not coincidental therewith. The axes of pistons 48 are also parallel with each of these axes. It is also to be noted that the shaft 68 extends axially to both sides of the center line or plane 72, that is, both inwardly and outwardly thereof, and at its outer end it drives the internal gear 71 which is outside the center line or plane 72. Furthermore, shaft 68 is parallel with shaft 43 and spaced therefrom and also parallel with and spaced from the axis of wheel 23—31. As a consequence all of the reduction gears are plain spur type and no bevel or helical gears are involved.

It is also to be noted that the motor 40 substantially in its entirety and a portion of the reduction gearing including a part of the shaft 68 and the gear 70 and ring gear 71, are entirely within the radial confines of the bearings 17 and 18 and the wheel 23—31 and also largely within the axial confines of said wheel, although a portion of the motor 40 including the head plate 46 and a very small portion of the shaft 68 extends outwardly beyond the axial confines of said wheel 23—31. The inner end of shaft 68 extends inwardly of the axial confines of wheel 23—31.

The inner end of the stub axle or housing 10 is mounted by the trunnions 11 to frame members of the vehicle, namely, the bracket 14—15 and the extreme inner end of said casting 10 which is in the form of the integral extension 39 is inwardly of the axis of said trunnions 11. It is thus evident that most of the reduction gearing, all excepting that provided by gears 70 and 71, is adjacent the inner end of the stub axle and is inwardly of the center line or plane 72 and in fact is inwardly of a plane along the inner edge of and thus outside the axial confines of the wheel 23—31. Also the axes of shafts 43, 61 and 68 and of gears 59, 60, 62, 65, 67, 70 and 71 all lie in a single horizontal plane which passes through the axis of rotation of the wheel 23—31. This maintains a low height for the casing for gears 60, 62, 65 and 67 and allows the trunnions 11 and bracket cups 12 to be within the radial confines of wheel 23—31.

It may be further pointed out that steering of the wheel is provided in the usual manner of a steering vehicle by swinging it on the trunnions 11 the cap 63 being provided at its rear with an ear 73 adapted to receive a steering rod or the like.

In the operation of the wheel, hydraulic fluid under pressure will be delivered to one of the conduits such as 53 which forms a pipe or duct conveying the hydraulic fluid such as oil under pressure to the motor 40. The other conduit 54 under these conditions forms a pipe or conduit for the return of the fluid from said motor 40. The hydraulic fluid is, of course, provided by a pump or the like and pressure is preferably applicable selectively to conduits 53 or 54 by a control valve of well known construction to cause the motor 40 to operate in reverse directions, thus providing for reverse rotation of the motorized wheel. The motor 40 is a relatively high speed motor. Due to this fact and due to the available high pressure fluid the overall dimensions of the motor 40 are relatively small and this is one of the reasons why I prefer a hydraulic motor to other types of motors, although, as previously stated, other types may be employed within the scope of my invention in some of its broader aspects. When the motor 40 operates, the rotor shaft 43 rotates and this motion is transferred to the wheel 23—31 through the aforedescribed three stage reduction gearing involving simple, rugged spur gears.

It is also to be noted that I have provided a very large brake mechanism having appreciable braking area and a brake drum with a large diameter, the brake preferably being of the hydraulic type and being mounted upon the casting 10 and being within the radial and axial confines of the wheel 23—31. The brake mechanism is well protected and housed. While I have shown the wheel as provided with pneumatic tire or pneumatic rubber tire, said wheel may be provided with a solid tire. It may be further stated that to conduct the hydraulic fluid to the head 55 I preferably employ flexible hydraulic tubes which are connected to the head 55 by threaded nipples, the tubes being preferably reinforced to withstand high hydraulic pressures.

While the motorized wheel of my invention may have a wide variety of uses, one particular field of application is in the field of coal mining in which it is employed on coal carrying buggies, coal kerf-cutting machines, and coal loading machines. As is well known the overall height of a coal seam is sometimes very restricted, consequently the maximum outside diameter of the wheel and the tire thereon is limited, as a consequence of which the diameter of the wheel is limited since tires of fairly great width are required. These factors contribute to make the size of the wheel and rim relatively small and the compactness of the structure which I have provided lends itself to being within the radial dimensions of a wheel of relatively small diameter and at the same time not unduly extending the axial dimensions of the motorized wheel and thus preventing cumbersomeness in the complete overall structure.

Also, the reducing gears in the housing formed by extension 39 and cap 63 may be varied in sizes to vary the total reduction from shaft 43 to wheel 23—31 in a large number of steps. I have designed such gears for a range from 49 to 1 reduction up to 9 to 1. This takes care of different demands of different machines. The three steps of speed reduction make this wide range in steps possible.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A motorized wheel comprising the combination with a hollow stub axle, of a wheel mounted thereon for rotation relative thereto, means for mounting the inner end of said stub axle to a vehicle, a hydraulic motor in said hollow stub axle having a head adjacent the outer end thereof and a rotor largely within the axial confines of said wheel and mounted on a shaft extending parallel to the axis of rotation thereof and axially from one side thereof to the other, reduction drive gearing connecting said shaft to said wheel including another shaft also extending axially from one side of said wheel to the other, hydraulic feed pipes leading to said head and formed as ducts in said hollow stub axle, and terminals for said feed pipes adjacent the inner end of said stub axle.

2. A motorized wheel including a stub axle, a wheel mounted thereon for rotation, means pivotally supporting said axle adjacent the inside thereof, a motor and reduction gearing carried within said stub axle and driving said wheel, the axes of said reduction gearing lying in a single horizontal plane and said gearing being positioned inwardly with respect to the supporting means and a housing for said reduction gearing including a substantially rectangular extension carried adjacent the inside thereof and having its major axis in a horizontal plane.

3. A motorized wheel construction including a stub axle, a wheel, bearing means mounting said wheel for rotation on said axle, a motor including a housing formed by said stub axle, a rotor and a straight rotor shaft carrying said rotor and mounted for rotation in said stub axle along an axis parallel with the axis of rotation of said wheel and extending substantially equally to opposite sides of the center plane of said wheel and to opposite sides of said bearing means, said motor being entirely within the radial confines of said bearing means and said rotor being substantially wholly within the axial confines thereof, and drive gearing between said rotor shaft and said wheel including another shaft mounted for rotation in said stub axle and located within the radial confines of said bearing means while extending parallel with said first named shaft and axially on opposite sides of said center plane of said wheel.

4. A motorized wheel including an enlarged stub axle, a wheel mounted for rotation thereon, a motor in said stub axle including a rotor mounted on a shaft supported in said stub axle and having an axis parallel with the axis of rotation of said wheel, said shaft extending across the central plane of said wheel and having a driving gear on its inner end, spaced upper and lower trunnions on said stub axle, gearing interconnecting said shaft with said wheel including said driving gear, said gearing being located largely on the opposite side of said trunnions from the rotor and including a drive shaft extending from said opposite side across said central plane.

5. A motorized wheel comprising in combination, a wheel; a housing; bearing means mounting said wheel for rotation upon said housing, the housing having an elongated end forming a gear case the major axis of which lies substantially at a right angle to the axis of rotation of said wheel and having a cylindrical portion extending into and contained within the axial and radial confines of said wheel; a motor having a shaft mounted rotor contained within the cylindrical portion of the housing and having its shaft extending into the gear casing; a gear on the end of the rotor shaft; reduction gearing in said gear case driven by said rotor shaft gear; drive means for said wheel including an internally toothed ring gear mounted to the wheel and adjacent the cylindrical portion of the housing; a drive shaft within the housing connecting said reduction gearing and wheel drive means; trunnions on opposite walls of the gear case portion of said housing, and means for supporting said trunnions.

6. A motorized wheel comprising in combination, a wheel; a housing; bearing means mounting said wheel for rotation upon said housing, the housing having an elongated end forming a gear case the major axis of which lies substantially at a right angle to the axis of rotation of said wheel and having a cylindrical portion extending into and contained within the axial and radial confines of said wheel; a hydraulic motor having a shaft mounted rotor contained within the cylindrical portion of the housing and having its shaft extending into the gear casing; a gear on the end of the rotor shaft; reduction gearing driven by said gear and located within said gear case, drive means for said wheel including an internally toothed ring gear mounted to the wheel and adjacent the cylindrical portion of the housing; drive means emanating from said reduction gearing and extending parallel to the axis of rotation of said wheel and having a gear thereon protruding through a wall of the cylindrical portion of said housing to drive said wheel driving means.

7. A motorized wheel comprising in combination, a wheel; a housing; bearing means mounting said wheel for rotation upon said housing, the housing having an elongated end forming a gear case, the major axis of which lies substantially at a right angle to the axis of rotation of said wheel and in a substantially horizontal plane and having a cylindrical portion extending into and contained within the axial and radial confines of said wheel; a motor having a shaft mounted rotor contained within the cylindrical portion of the housing and having its shaft extending into the gear casing; a gear on the end of the rotor shaft; reduction gearing in said gear case driven by said gear, drive means for said wheel including an internally toothed ring gear mounted to the wheel and adjacent the cylindrical portion of the housing; drive means emanating from said reduction gearing and extending parallel to the axis of rotation of said wheel and having a gear thereon protruding through a wall of the cylindrical portion of said housing to drive said wheel driving means; trunnions on top and bottom walls of the gear case portion of said housing and adjacent its outer end near said cylindrical portion, and means for supporting said trunnions.

8. A motorized wheel comprising in combination, a wheel; a housing; bearing means mounting said wheel for rotation upon said housing, the housing having an elongated end forming a gear case the major axis of which lies substantially at a right angle to the axis of rotation of said wheel and having a cylindrical portion extending into and contained within the axial and radial confines of said wheel; a hydraulic motor having a shaft mounted rotor contained within the cylindrical portion of the housing and having its shaft extending into the gear casing; a gear on the end of the rotor shaft; drive means for said wheel including an internally toothed ring gear mounted to the wheel and adjacent the cylindrical portion of the housing; a drive shaft within the housing connecting through reduction gearing to said wheel drive means; trunnions on opposite walls of the gear case portion of said housing; and brake means on said wheel, the said trunnions lying within the radial and substantially within the axial confines of the brake means.

9. A motorized wheel comprising in combination, a wheel; an open ended housing forming a gear casing and a cylindrical portion cantilevered therefrom to form a stub axle; drive means for said wheel including an internally toothed gear attached thereto and positioned adjacent the end of said axle; a hydraulic motor contained within the axle and having a shaft mounted rotor, the shaft extending inwardly into the gear casing; a gear on the end of said motor shaft; reduction gearing within the gear casing; a drive shaft extending substantially through the housing and connecting the motor shaft through the reduction gearing with the drive means for said wheel; a cover for the gear casing; trunnions on opposite sides of the gear casing, and means supporting said trunnions.

10. A motorized wheel comprising in combination, a wheel; an open ended housing forming a gear casing and a cylindrical portion cantilevered therefrom to form a stub axle; drive means for said wheel including an internally toothed gear attached thereto and positioned adjacent the end of said axle; a hydraulic motor contained within the axle and having a shaft mounted rotor, the shaft extending inwardly into the gear casing; a gear on the end of said motor shaft; reduction gearing within the gear casing; means on the end of said housing including a support for the reduction gearing; a drive shaft emanating from the reduction gearing and extending parallel to the axis of said axle; and a gear on the drive shaft protruding through a wall of the axle and engaging the wheel driving means.

11. A motorized wheel comprising in combination, a wheel; an open ended housing forming a gear casing and a cylindrical portion cantilevered therefrom to form a stub axle; drive means for said wheel including an internally toothed gear attached thereto and positioned adjacent the end of said axle; a hydraulic motor contained within the axle and having a shaft mounted rotor, the shaft extending inwardly into the gear casing; a gear on the end of said motor shaft; reduction gearing within the gear casing; a drive shaft extending substantially through the housing and connecting the motor shaft through the reduction gearing with the drive means for said wheel; a cover for the gear casing; and closure means for the outer end of the axle, said closure means cooperating with the motor rotor to form inlet and exhaust valves for said motor.

12. A motorized wheel including a hollow stub shaft having an outer generally cylindrical wheel receiving portion and an inner gear housing portion of elongated shape with its greater dimension substantially horizontal, a wheel, bearing means mounting said wheel for rotation on said cylindrical portion, a driving motor for said wheel mounted within said cylindrical portion and within the radial confines of said bearing means, reduction gearing extending from said motor to said wheel including a plurality of gears located on horzontally spaced axes and within said gear housing portion of said stub shaft, and means including top and bottom trunnions for pivotally mounting said stub shaft for steering movement, said trunnions being formed on the outer part of said gear housing near the cylindrical portion of said stub shaft whereby the major portion of said gear housing is positioned inwardly of said trunnions.

STERLING C. MOON.

REFERENCES CITED

The following references are of record in the file of this patent:

UNITED STATES PATENTS

| Number | Name | Date |
| --- | --- | --- |
| 716,065 | Ledwinka | Dec. 16, 1902 |
| 1,101,201 | Linderoth | June 23, 1914 |
| 1,313,937 | Brinton | Aug. 26, 1919 |
| 1,421,545 | Osborn | July 4, 1922 |
| 1,452,698 | Osborn | Apr. 24, 1923 |
| 1,642,103 | Daubenmeyer | Sept. 13, 1927 |
| 1,781,133 | Shaff | Nov. 11, 1930 |
| 2,250,031 | Nathan | July 22, 1941 |
| 2,258,328 | Lee et al. | Oct. 7, 1941 |
| 2,353,730 | Joy | July 18, 1944 |
| 2,357,742 | Jeffrey | Sept. 5, 1944 |

FOREIGN PATENTS

| Number | Country | Date |
| --- | --- | --- |
| 7,081 | Great Britain | Mar. 25, 1908 |
| 9,056 | Great Britain | Apr. 25, 1908 |
| 346,269 | France | Nov. 19, 1904 |